Figure 1:
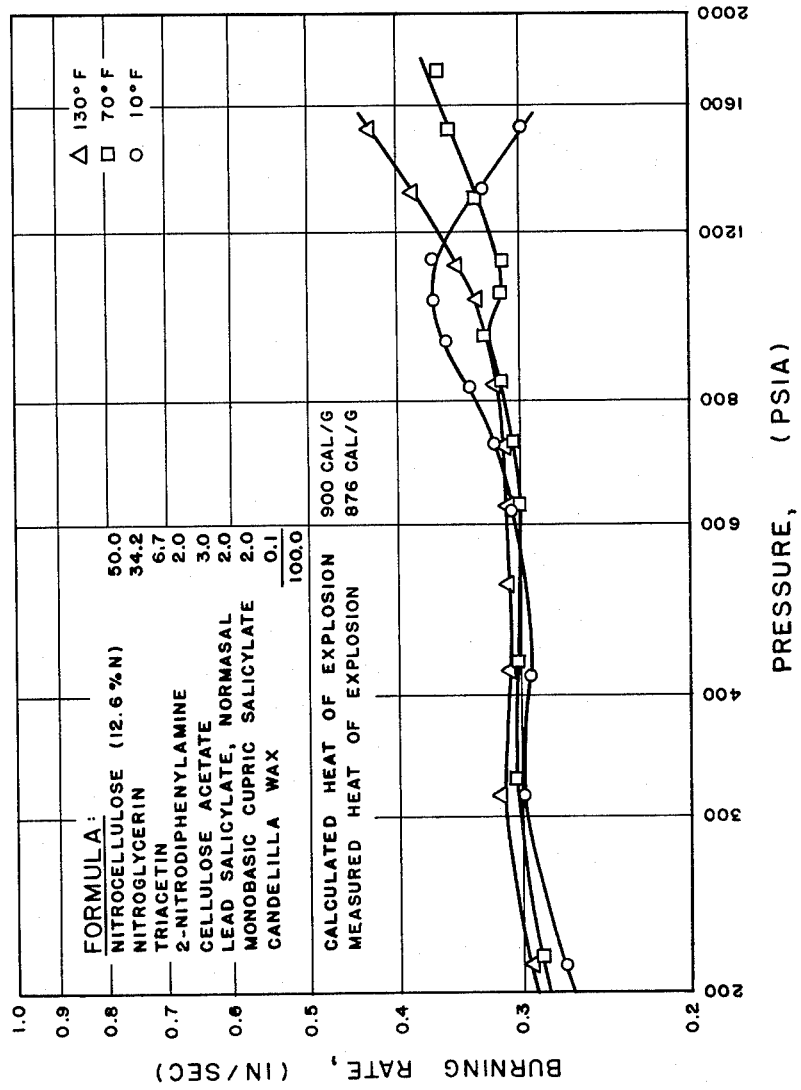

INVENTORS.
ALBERT T. CAMP
FRANK G. CRESCENZO
BY

ATTORNEYS.

INVENTORS.
ALBERT T. CAMP
FRANK G. CRESCENZO
BY

ATTORNEYS.

INVENTORS.
ALBERT T. CAMP
FRANK G. CRESCENZO
BY

ATTORNEYS.

INVENTORS.
ALBERT T. CAMP
FRANK G. CRESCENZO

ATTORNEYS.

INVENTORS.
ALBERT T. CAMP
FRANK G. CRESCENZO
BY
ATTORNEYS.

INVENTORS.
ALBERT T. CAMP
FRANK G. CRESCENZO

ATTORNEYS.

INVENTORS.
ALBERT T. CAMP
FRANK G. CRESCENZO

ATTORNEYS.

INVENTORS.
ALBERT T. CAMP
FRANK G. CRESCENZO

ATTORNEYS.

INVENTORS.
ALBERT T. CAMP
FRANK G. CRESCENZO
BY

ATTORNEYS.

INVENTORS.
ALBERT T. CAMP
FRANK G. CRESCENZO
BY
ATTORNEYS.

INVENTORS.
ALBERT T. CAMP
FRANK G. CRESCENZO

ATTORNEYS.

3,138,499
NITROCELLULOSE GAS PRODUCING CHARGES CONTAINING COPPER AND LEAD SALTS AND ALUMINUM

Albert T. Camp and Frank G. Crescenzo, China Lake, Calif., assignors to the United States of America as represented by the Secretary of the Navy
Filed May 28, 1958, Ser. No. 738,580
2 Claims. (Cl. 149—38)
(Granted under Title 35, U.S. Code (1952), sec. 266)

The invention described herein may be manufactured and used by or for the Government of the United States of America for governmental purposes without the payment of any royalties thereon or therefor.

This invention relates to gas producing charges; more particularly, it relates to double base propellants exhibiting very low dependence of burning rates on conditioned temperature. This invention is similar to that disclosed in a copending case, Serial Number 352,312, filed April 30, 1953, Notice of Allowability February 17, 1955, now Patent No. 3,088,858, but extends the temperature insensitive characteristics claimed in the pending case over a wider range of energy contents, operating pressures, and burning rates. A method of making said propellants without the use of organic solvents is also provided by the inventors.

At a given initial temperature, the burning rate of a conventional propellant is a direct function of the pressure to which it is exposed. The relationship is expressed mathematically as: $r = cp^n$ where $r$ is the burning rate, $p$ is the pressure, and $c$ and $n$ are constants characteristic of the particular propellant. The equation can be re-expressed as: $\log r = n \log p + \log c$. Thus a plot of $\log r$ against $\log p$ for a conventional propellant gives a straight line which has a slope $n$. Log $r$ increases linearly with $\log p$, but $r$ increases exponentially with $p$.

With such conventional propellants, pressures build up rapidly and a thick-walled chamber is needed to contain the propellant tending to make rockets thus powered heavy and poor in ballistic performance.

Further, such conventional propellants have burning rates which are dependent upon initial temperature, and consequently performance of the rocket powered by them varies widely, depending upon the temperature of the propellant at firing.

Research led to the development of plateau type propellants wherein the pressure exponent $n$ is zero in a certain region of pressure. Such propellants at a given ignition temperature give steady burning rate within the region and consequently steady thrust, and the trajectories of rockets so powered are much flatter and easier to calculate. However, the performance of plateau propellants is still very much dependent on ignition temperature, and they possess rather low heats of explosion and accordingly low specific impulse.

The present invention, and the copending one referred to above, relate to mesa type propellants, that is, those in which the pressure exponent $n$ is negative in certain regions of pressure so that the burning rate decreases slightly with increasing pressure. The region of negative pressure exponent is known as the mesa region.

These propellants are also characterized by the fact that their burning rates are substantially temperature insensitive over wide ranges of operating pressures, including the mesa region. The pressure within rocket motors thus powered can be regulated by proper nozzle design to keep it in the mesa region and thus to provide for steady thrust. With the temperature insensitivity feature, a motor of substantially constant thrust can be attained, regardless of firing conditions. The utility of such a rocket motor is obvious.

Further, if the grain cracks during burning and exposes more surface, a mesa propellant will exhibit an increase in pressure roughly proportional to the added surface exposed while a conventional propellant would exhibit a much more rapid increase, very likely explosive in nature.

In the past, organic solvents have generally been used in the processing of propellants. The adverse effect of these solvents on the highly sensitive ballistic properties of double base propellants is well known so that their use should be avoided if at all possible in the interest of obtaining propellants giving reproducible ballistic characteristics.

It is an object of this invention to provide double base propellants of the mesa type in which the burning rate is substantially constant regardless of initial temperature between the pressure ranges of about 200 to over 4000 p.s.i. absolute.

It is another object of this invention to provide a double base propellant system in which the pressure-burning rate relationship can be adjusted to provide propellants for varying required applications.

It is a further object of this invention to provide a propellant which has good surveillance characteristics and which is readily reproducible in mass quantity.

It is a further object of this invention to provide a solventless method of manufacture of such propellants.

The above objects can be accomplished by a nitrocellulose-nitroglycerin double base propellant to which has been added, in addition to the usual plasticizers and stabilizers, ballistic modifiers comprising lead and copper salts of aromatic acids including their monobasic forms, and mixtures thereof. Additionally, fine granular aluminum may be added in certain cases to raise the heat of explosion of the mixture. The heat of explosion of the composition is preferably in the range of 600–1250 cal./gm. If this upper limit is appreciably exceeded the mesa effect is destroyed.

Aluminum is only added to mixtures containing both a lead salt and a copper salt. It is a metallurgical fact that the aforementioned combination provides for the formation in situ of catalyzing agents for the combustion of aluminum. The presence of this combination of salts preserves the mesa effect which would otherwise be destroyed by the aluminum. The discovery of the combined effect produced by the above combination is entirely unexpected and unpredicted.

The preferred amount of modifier added ranges from about zero to five percent by weight for each lead and copper salt, 10 percent being the maximum permissible amount. The amount of aluminum ranges from about zero to about 10 percent.

In addition to the aforementioned modifiers, the propellant should have the following approximate composition: nitrocellulose 40–60 percent, nitroglycerin 30–45 percent, plasticizer 0–10 percent, stabilizer 1–3 percent. The plasticizer used may be a phthalate, adipate, sebacate, glycol or glycerol ester, all well known in the art. Suitable stabilizers are derivatives of urea, diphenylamine and aniline, also well known in the art. Plasticizers and stabilizers must be substantially non volatile.

Such propellent compositions give temperature insensitive mesas over a pressure range of less than 1000 p.s.i. to over 4000 p.s.i. The upper limit of the pressure range for these compositions is considerably increased over that of the compounds of the copending case, which is about 2500 p.s.i. Burning rates may be varied from about 0.3 inch per second to about 1.5 inches per second.

The propellants described above are made as follows. Nitrocellulose is mixed to a thin slurry in approximately 5–10 times its weight of warm water, and finely ground stabilizer is slowly added with stirring. Insoluble finely ground ballistic modifiers are added with stirring; the monobasic salts are insoluble and are added at this point. A solution of nitroglycerin in the plasticizer is added and any remaining water-insoluble ingredients are added with thorough mixing to insure uniformity. The modifiers can be added before or after the nitroglycerin. Alternatively, if it is desired for reasons of safety to desensitize the nitroglycerin it may be dissolved in methyl alcohol and added to the slurry, and the plasticizer added later. The water of the slurry dissolves the alcohol, leaving substantially none of it in the colloid.

The slurry is filtered or centrifuged to remove most of the water, and the resulting paste is aged from 1–5 days at 130° F. After aging, the moisture level is from 8–15 percent. Any ingredients not previously incorporated are added to the paste, and the resulting mixture is milled to a homogeneous colloid on a heated differential rolling mill. The normal salts are soluble and must be blended into the paste. The colloid may then be extruded into desired form, or it may first be sized on an even-speed rolling mill. The order of mixing is not critical, but uniformity is. Candelilla wax is added in minute amounts to enhance extrusion properties.

The ballistic modifiers comprise the lead and copper salts of certain aromatic acids, in normal and monobasic forms. The two preferred acids are beta-resorcylic and salicylic, but substitutes for beta-resorcylic acid are 2,5-dihydroxybenzoic acid and 5-methylene disalicylic acid.

The advantages of the invention will be better from the description which follows taken in connection with the drawings which form a part of this specification, all the figures being graphs of the pressure-burning rate relationships for the various propellants tested. The compositions of the particular propellants are given on the drawings along with the pressure-burning rate curve, and the amounts of components are given in weight percents. The calculated and measured heats of explosion are also presented on the drawings in calories per gram.

The heat of explosion was measured in a standard plain single jacket calorimeter by standard calorimetric techniques. The calculated heat of explosion was obtained by multiplying the percentage of each component by the heat of explosion of the pure component which has been previously measured in a calorimeter. This product is called the $Q_1$ value and the algebraic sum of the $Q_1$ values is the calculated heat of explosion.

The data for the curves of the pressure-burning rate relationship were obtained by standard techniques. Strands of propellant 0.1 inch in diameter and 7.5 inches long were coated with vinyl lacquer. A Chromel wire was inserted in each strand near one end normal to the axis for attaching the strands inside a Crawford type bomb. Holes were drilled in each strand exactly two inches apart, and 0.5 ampere capacity fuses inserted in each strand. An individual strand was placed in a Crawford bomb, connected to appropriate ignition and timing devices and burned from top to bottom at substantially constant pressure. The pressure of the nitrogen gas in the bomb would be varied and another strand burned. Burning rates calculated from recorded times and the known length of strands along with the recorded average pressure of the nitrogen gave a series of points which were plotted on logarithmic paper and which resulted in a straight line with a positive slope up to a certain pressure, then the line remained substantially straight but its slope became negative up to another pressure, then the slope became positive again.

The slope of the straight line is $n$, the pressure exponent, and it is the tangent of the angle the line makes with the horizontal coordinate. The angle is simply measured with a protractor and its tangent obtained from trigonometric tables. The points almost never fall exactly within a straight line, so they are fitted to the best straight line running between them by the method of least squares.

The tests were performed on propellants incorporating lead and copper salts of salicylic and β-resorcyclic acids in their normal and their monobasic forms, and mixtures thereof. Aluminum was added in certain compositions to increase the heat of explosion. The compositions are given in weight percent.

The test results indicate that a wide range of operating pressures and burning rates along with temperature insensitivity is available to the rocket designer, a significant improvement over anything such designers have had to work with before. As the data show, the mesas can be shifted from a slow burning-low pressure zone to a rapid burning-high pressure zone, and to almost any intermediate zone. Burning rates range from as little as about 0.3 inch per second to about as high as 1.5 inch per second on the mesa while useful pressure range varies from about 200 p.s.i. to over 4000 p.s.i.

Figure 2:
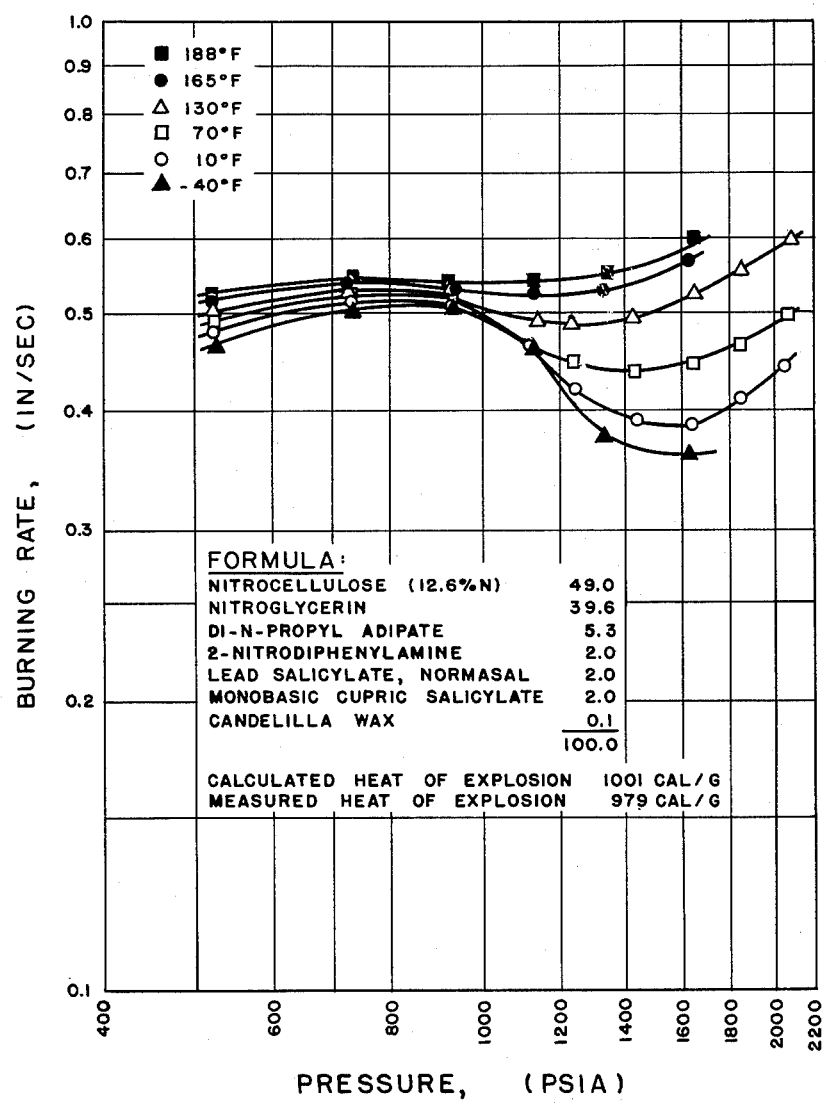

Reference is now made to FIGS. 1 and 2. Results are shown for compositions which give low burning rates at low pressures. The composition of FIG. 1 behaves more like a plateau propellant than a mesa type but gives very good temperature insensitivity between 200 and 800 p.s.i. Such a composition is useful as a low pressure propellant. The composition of FIG. 2 exhibits a mesa but the best temperature insensitivity comes before the mesa, between 500 and 1000 p.s.i. Both compositions contain lead salicylate and monobasic cupric salicylate in the amount of two percent each.

Figure 3:
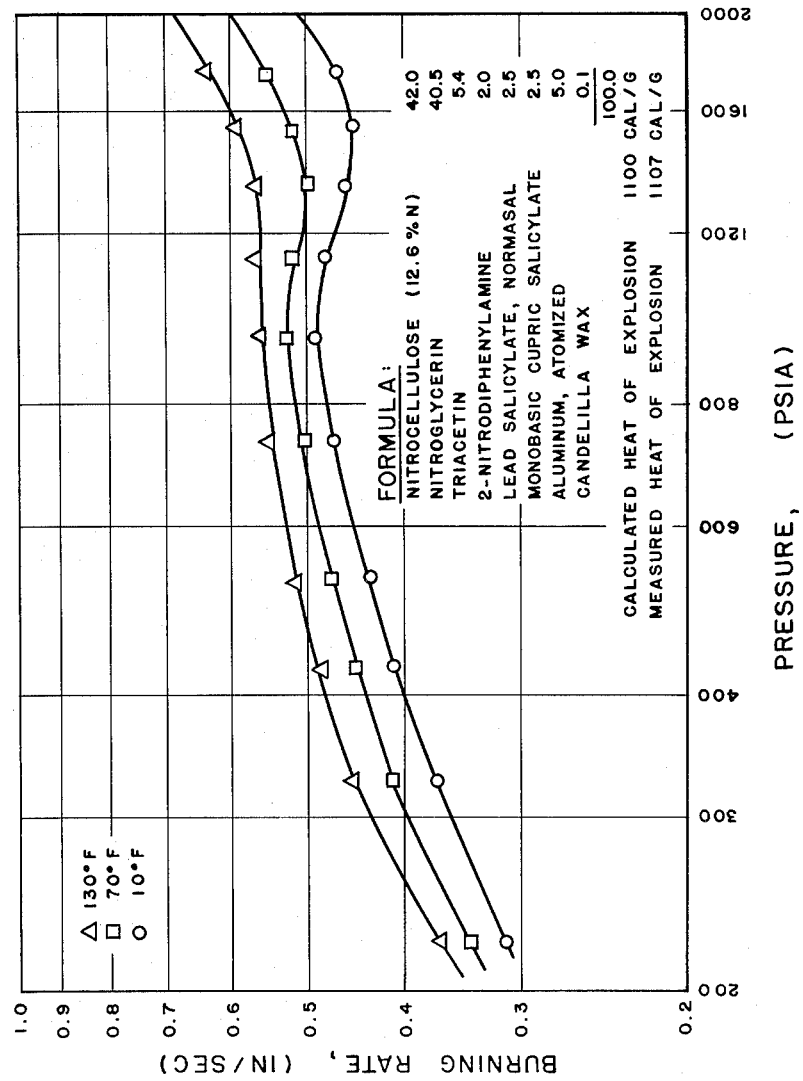

In FIG. 3, the percentages of lead salicylate and monobasic cupric salicylate are 2.5 percent each but the nitroglycerin has been increased and five percent aluminum has been added with consequent increase in heat of explosion. Still the burning rate is not high, about 0.5 inch per second.

Figure 4:
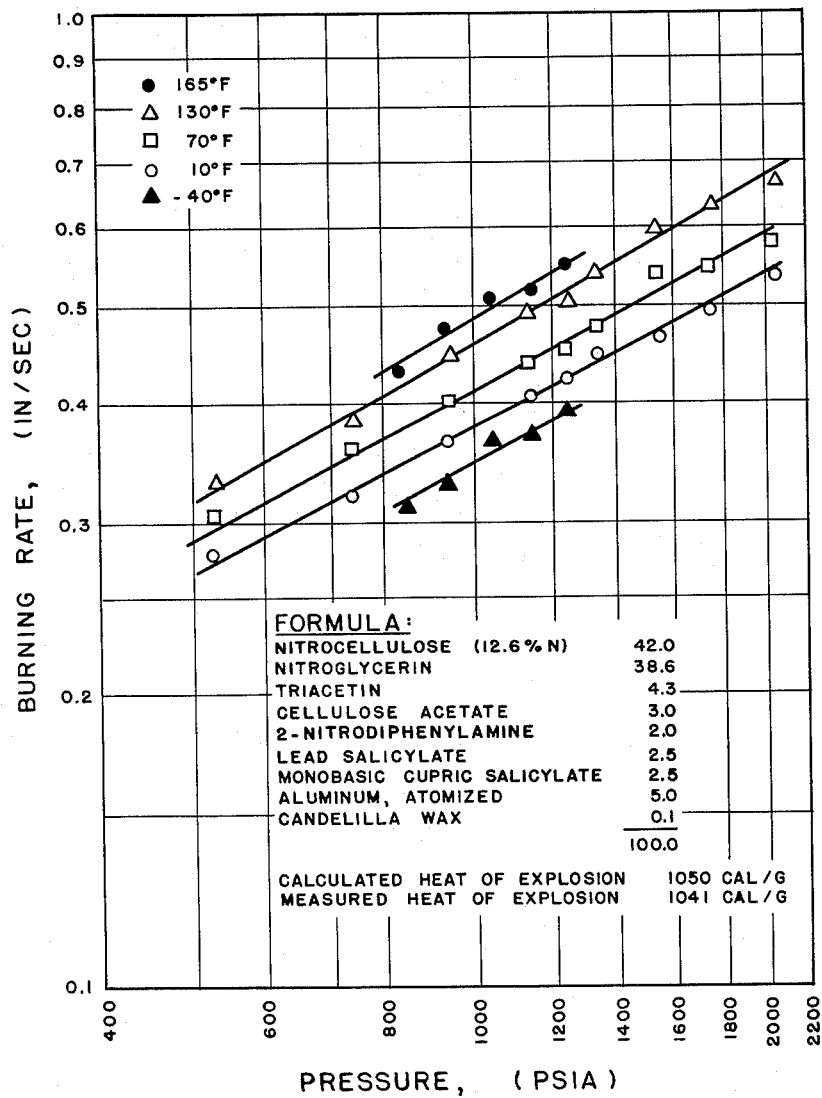

The composition of FIG. 4 does not exhibit a mesa, however, it represents a low-burning-rate, low-slope, high impulse propellant. It illustrates the use of a built-in rate depressor, cellulose acetate, to provide a specific burning rate.

Figure 5:
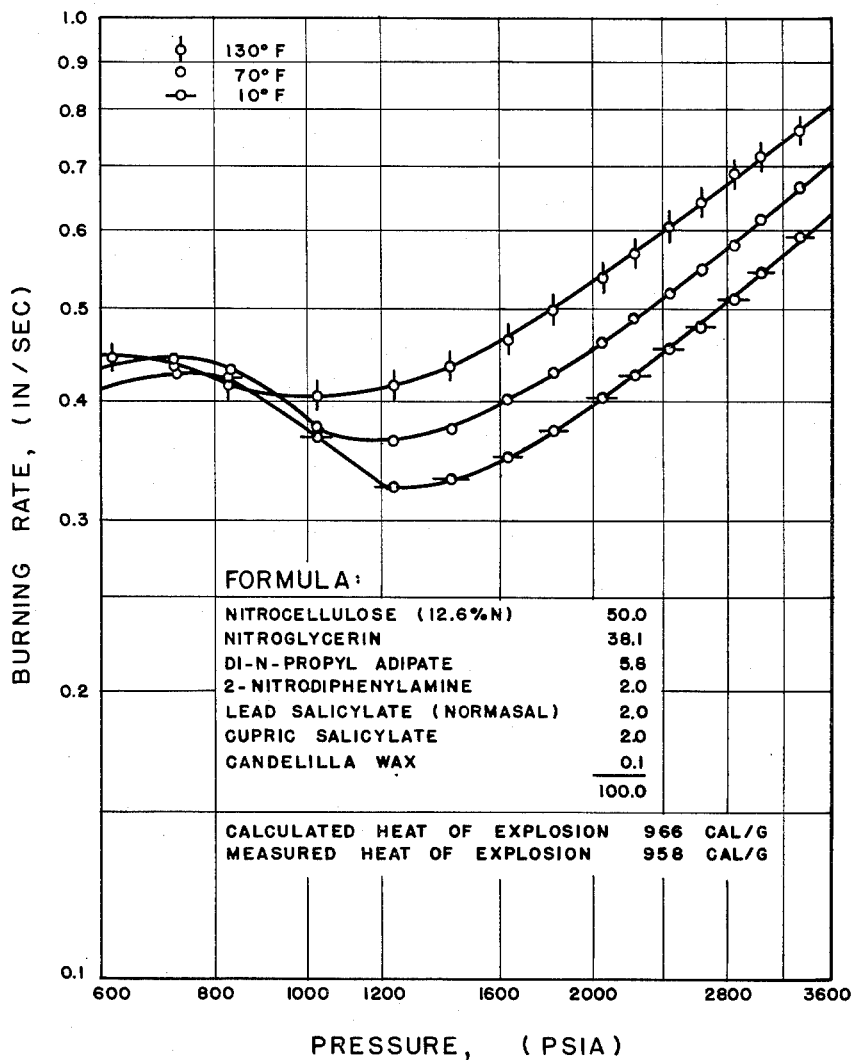

The composition of FIG. 5 illustrates the use of the combination of cupric and lead salicylate to produce low burning rates and low pressures. Very good temperature insensitivity is produced in the region of below 600–1000 p.s.i. with a burning rate of about 0.4 inch per second. With the combined use of both salicylic acid salts as the modifiers, low burning rate-low pressure, mesa propellants are produced. The burning rate and the operating pressure can be raised by adding aluminum to the mixture.

Figure 6:
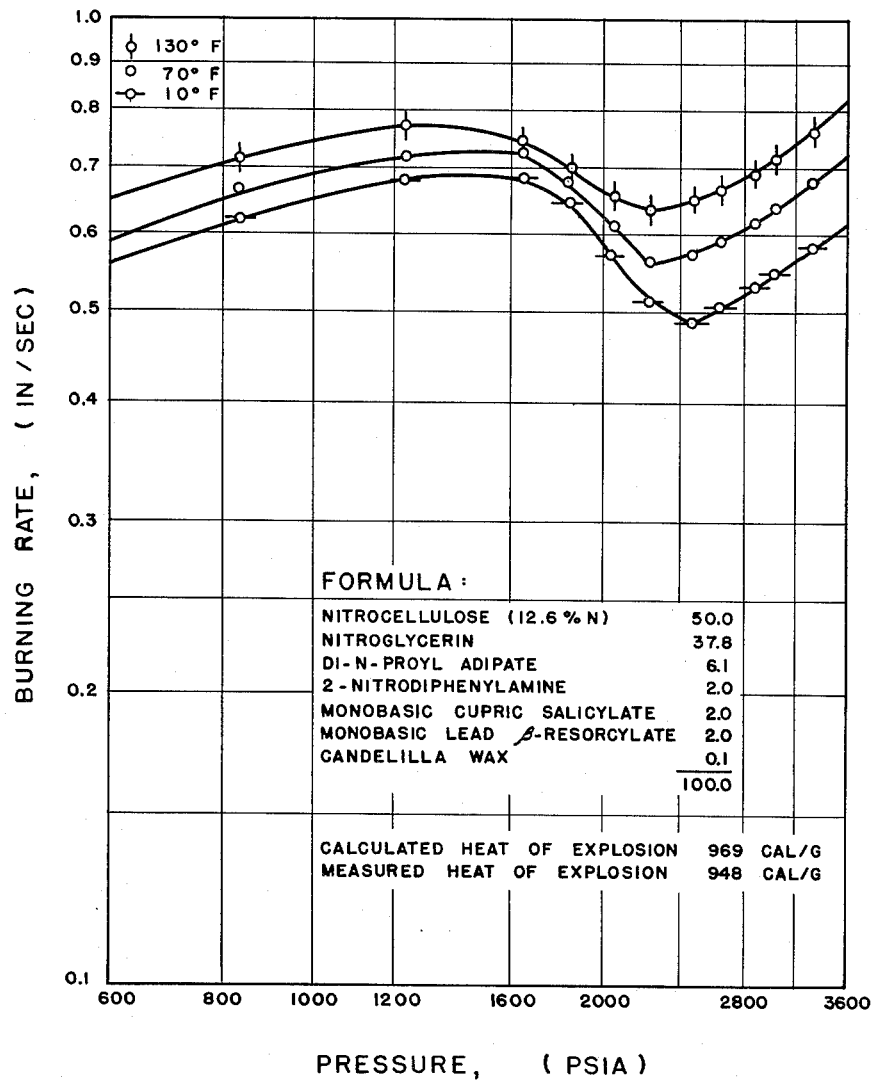
Figure 7:
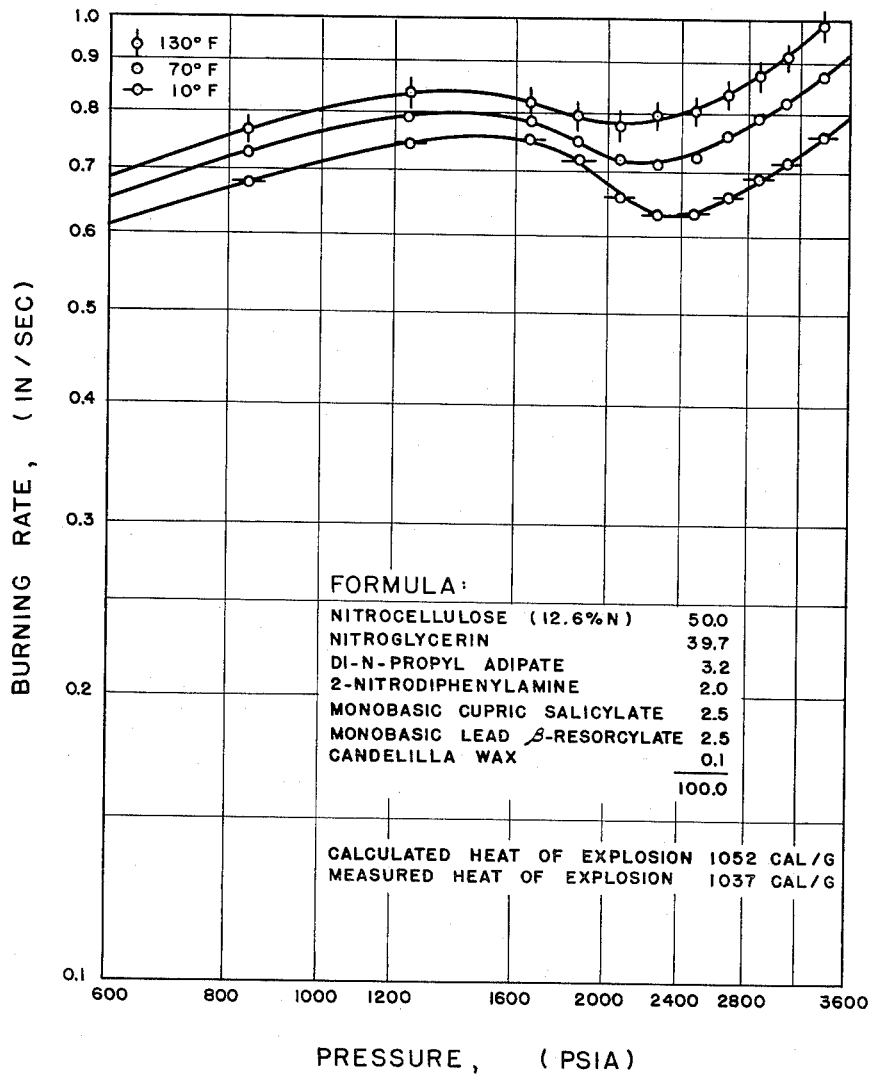
Figure 8:
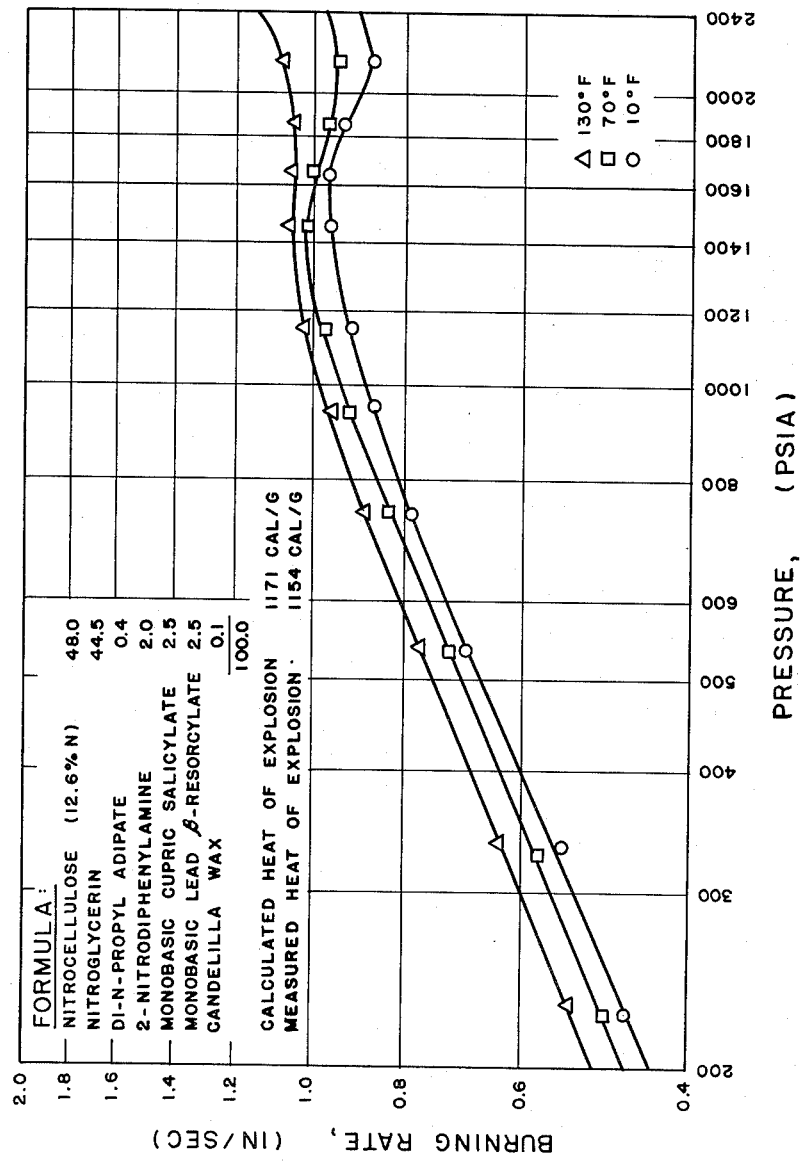

The compositions of FIGS. 6, 7 and 8 illustrate the use of a combined monobasic cupric salicylate-monobasic lead β-resorcylate modifier. Mesas occur at about 1500 p.s.i. in all three at 0.7 inch per second to 1.0 inch per second burning rates. Good temperature insensitivity occurs at about 1600–2000 p.s.i. in all three. The percentage of modifier is the same in the compositions of FIGS. 7 and 8 and slightly lower in that of FIG. 6.

Figure 9:
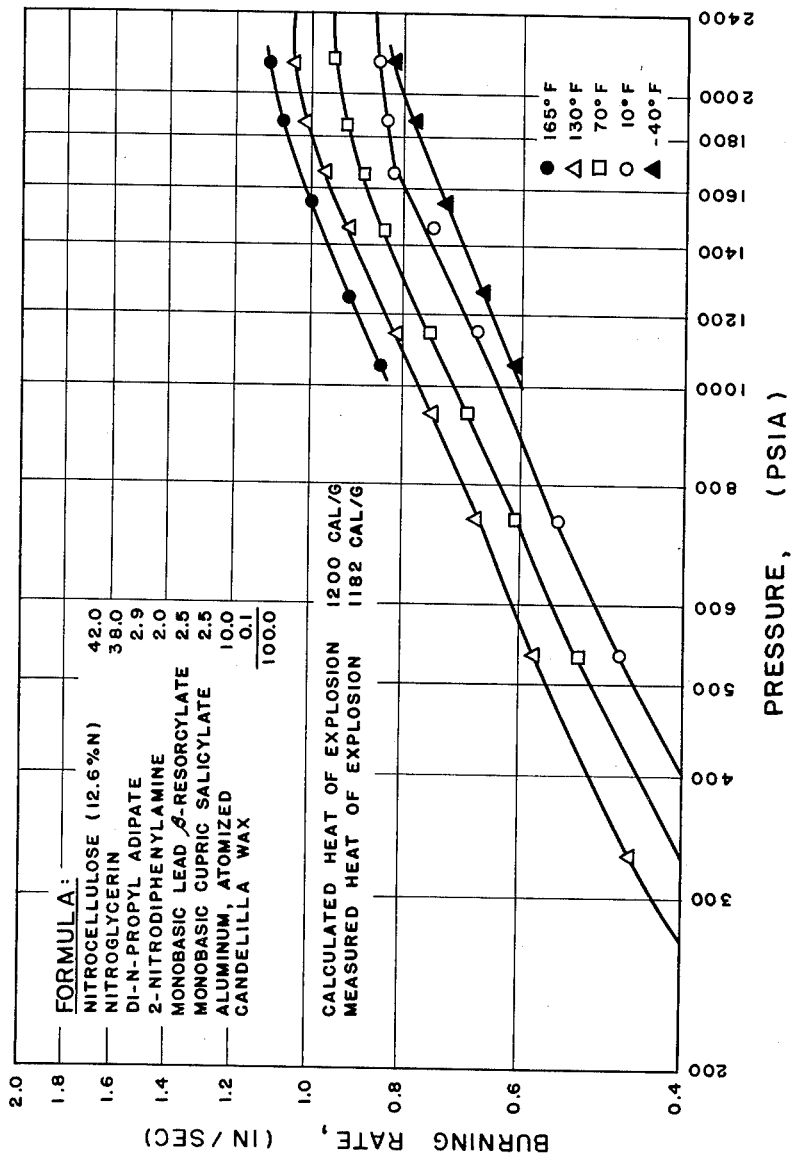
Figure 10:
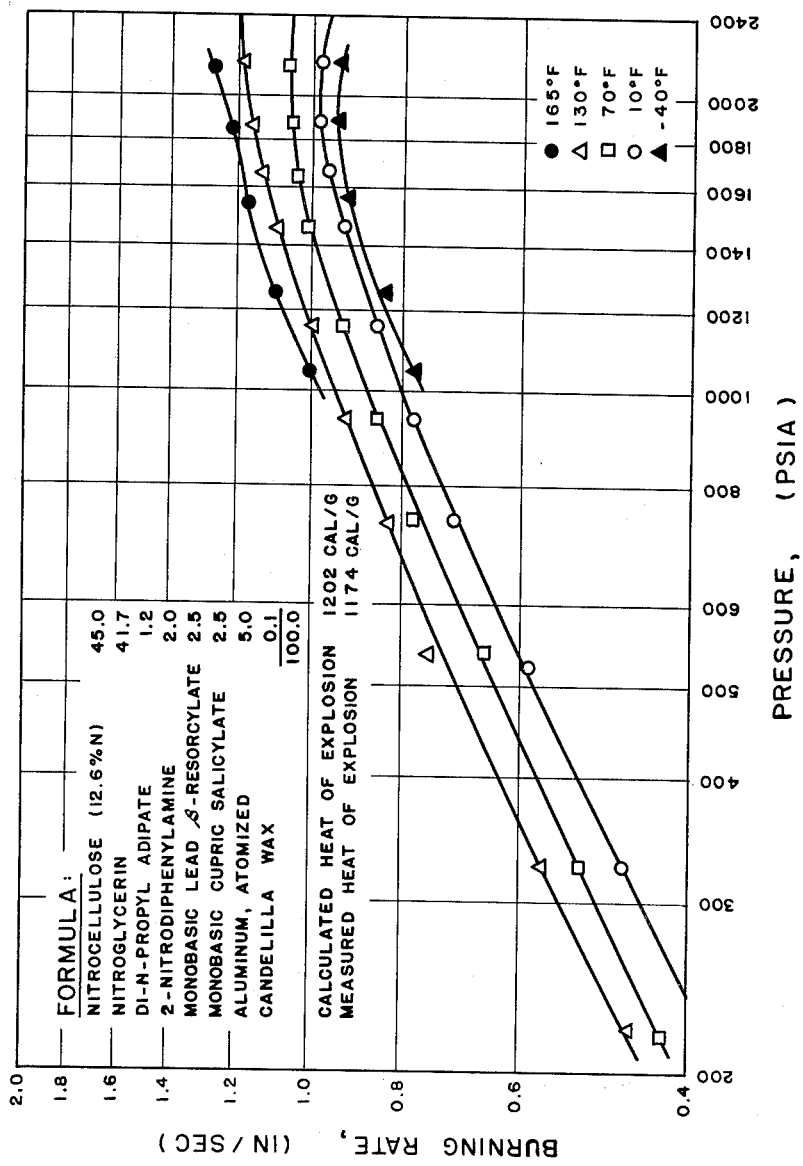

FIGS. 9 and 10 show the same system as FIGS. 6, 7 and 8 but with aluminum added. Heats of explosion are increased and mesas have been shifted to the right. Ten percent aluminum gives but little different data from five percent, and burning rates are practically the same. These facts are remarkable in that as little as one percent of aluminum tended to vitiate mesas of the propellants described in Serial Number 352,312.

Figure 11:
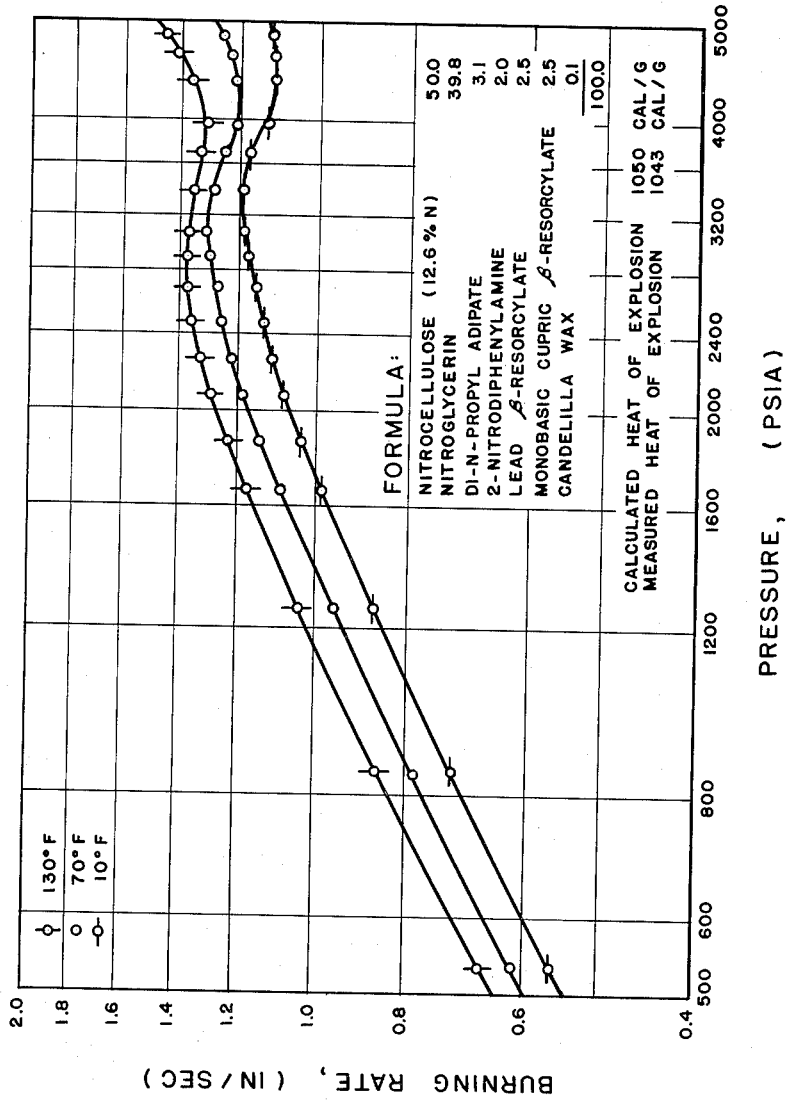
Figure 12:
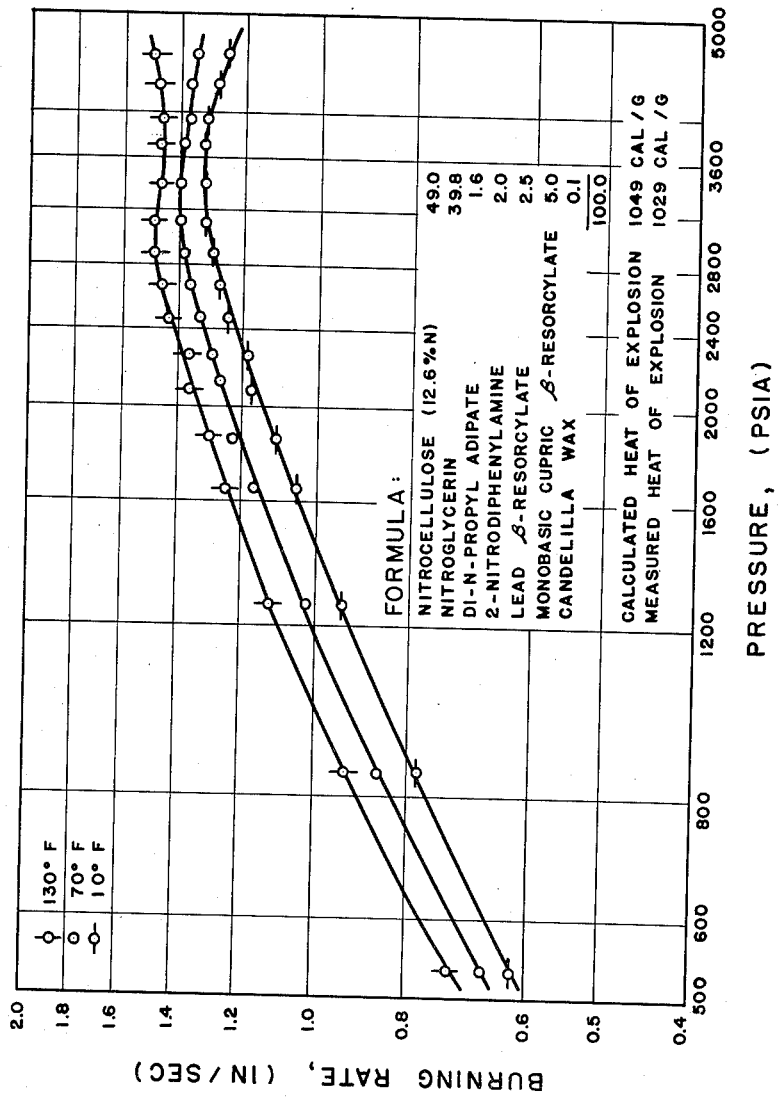
Figure 13:
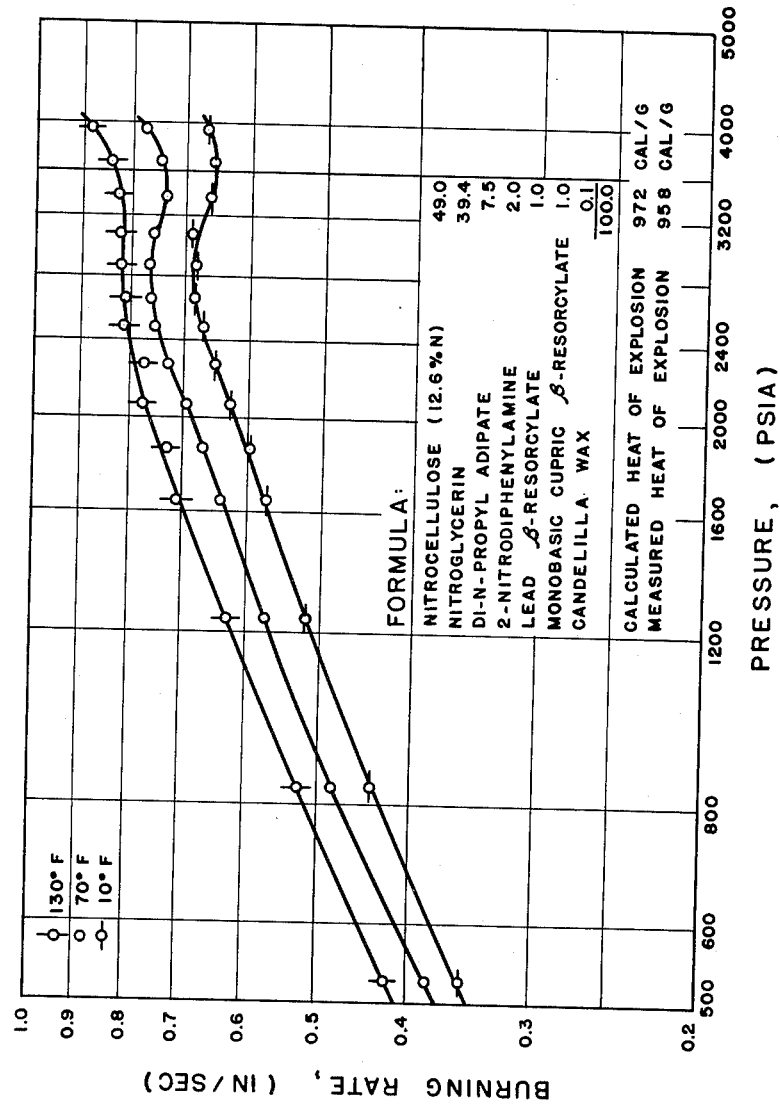
Figure 14:
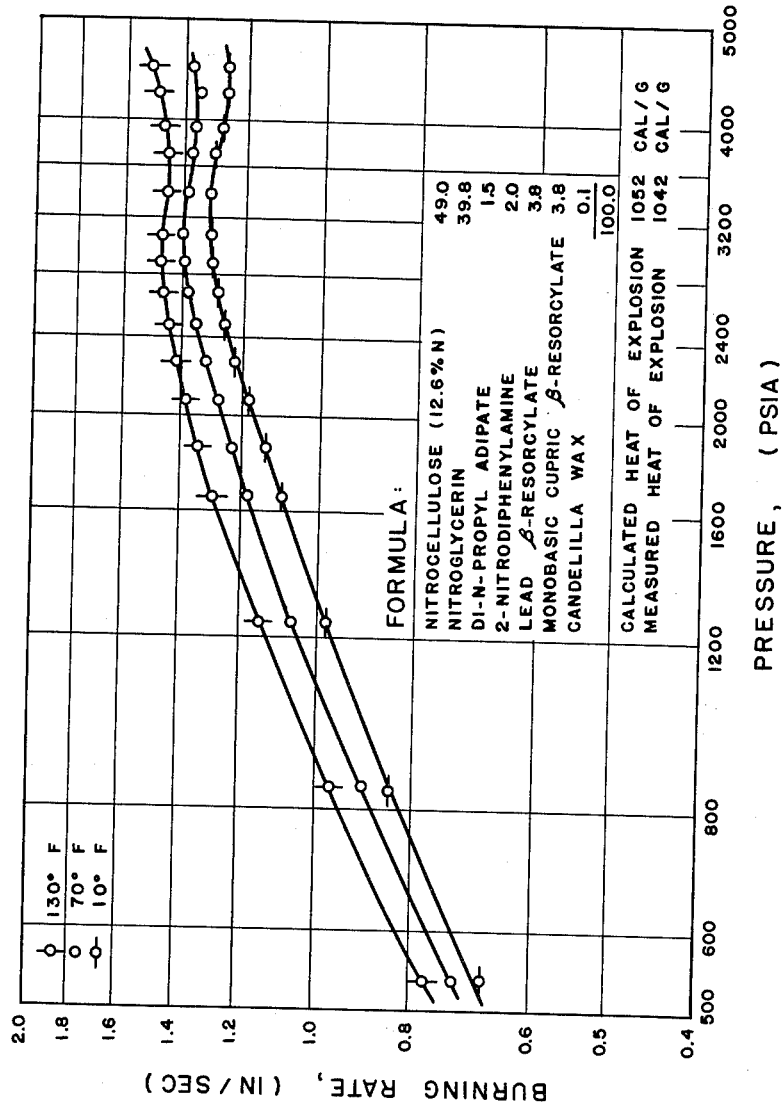

The compositions of FIGS. 11, 12, 13 and 14 illustrate the use of a combined lead β-resorcylate and monobasic cupric β-resorcylate modifier. In the composition of FIG. 13, each salt is present in the amount of one percent. The heat of explosion is intermediate, 972 cal./gm. The mesa starts at about 2800 p.s.i. at a burning rate of 0.7 inch per second to 0.8 inch per second. The composition of FIG. 11 shows results obtained by increasing the amount of each modifier salt to 2.5 percent. The increase is accompanied by slight increases in burning rates, shift of the mesa to the right, and temperature insensivity in the mesa. In the composition of FIG. 14, the content of each modifier salt has been increased to 3.8 percent, accompanied by further increases of the aforementioned types. In the composition of FIG. 12 the copper salt is increased to twice the amount of the lead salt, five percent to 2.5 percent respectively; results differ little from those for the composition shown in FIG. 11 where each compound was present in the amount of 2.5 percent, but the burning rates are increased slightly, and mesas are shifted slightly to the right. In all four of these compositions, the nitrocellulose and nitroglycerin compositions were varied only slightly, but the amount of plasticizer was varied considerably to determine the effect of varying the amounts of ballistic modifier salts. As has been shown, as little as one percent of each salt produces the desired mesa, and increasing amounts of salts tend to increase the rate.

Figure 15:
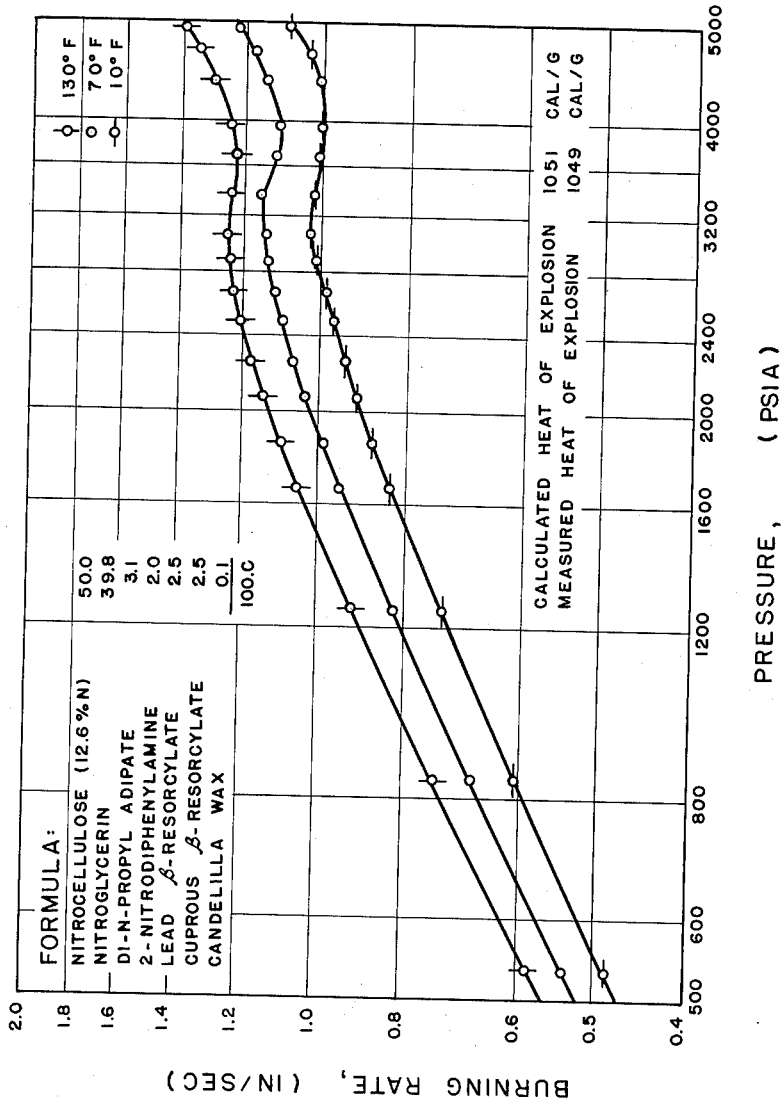

The composition of FIG. 15 incorporates modifying salts cuprous β-resorcylate and lead β-resorcylate in the amount of 2.5 percent each. Performance is similar to that of the compositions of FIGS. 11, 12, 13 and 14 where monobasic cupric β-resorcylate was used.

Figure 16:
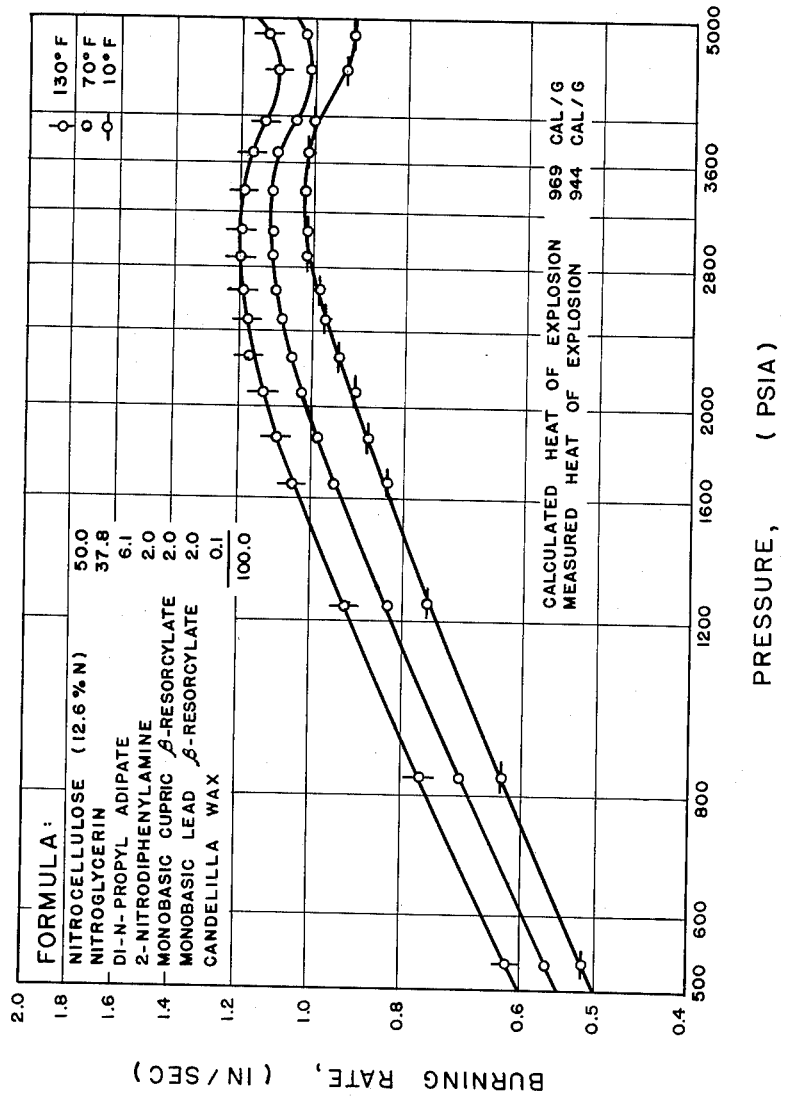
Figure 17:
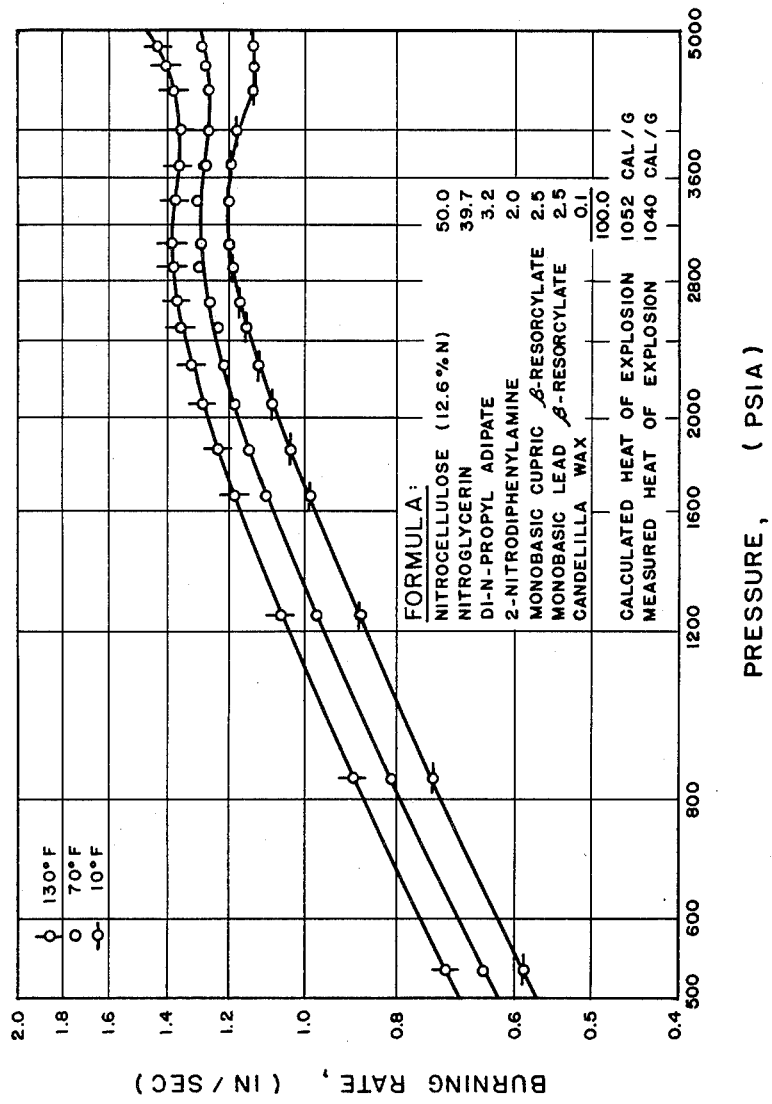
Figure 18:
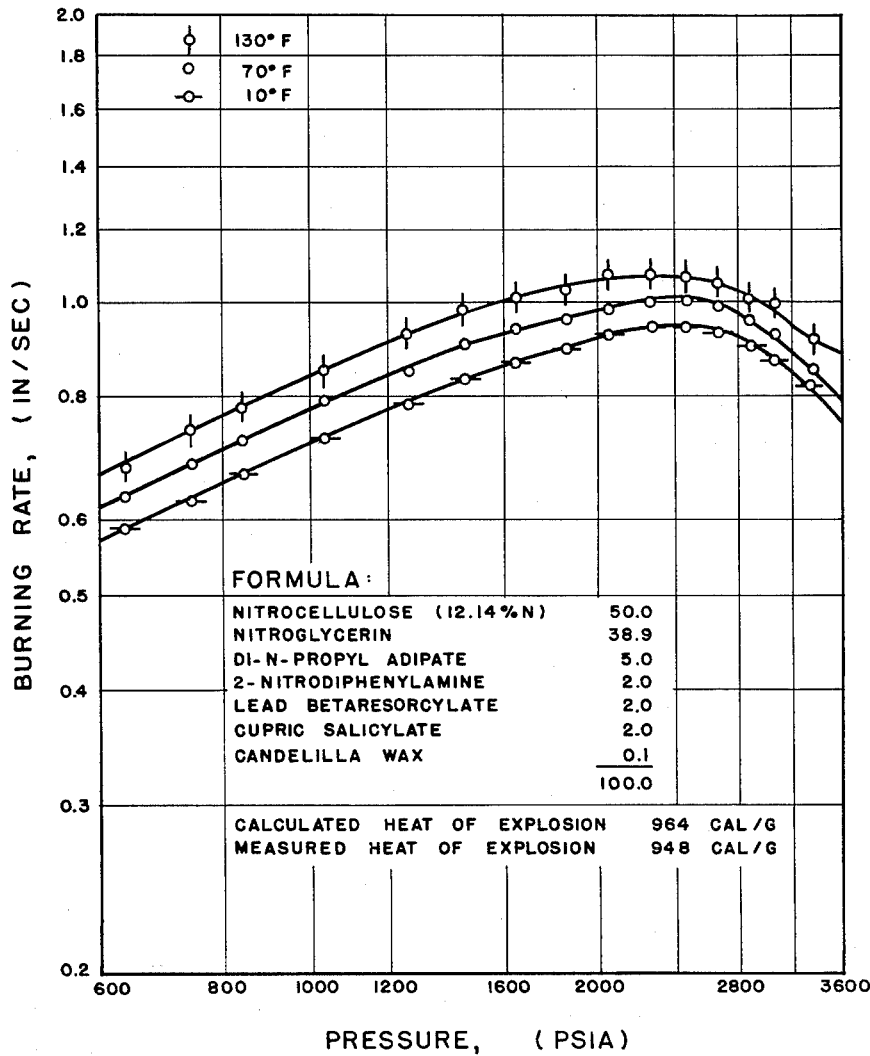
Figure 19:
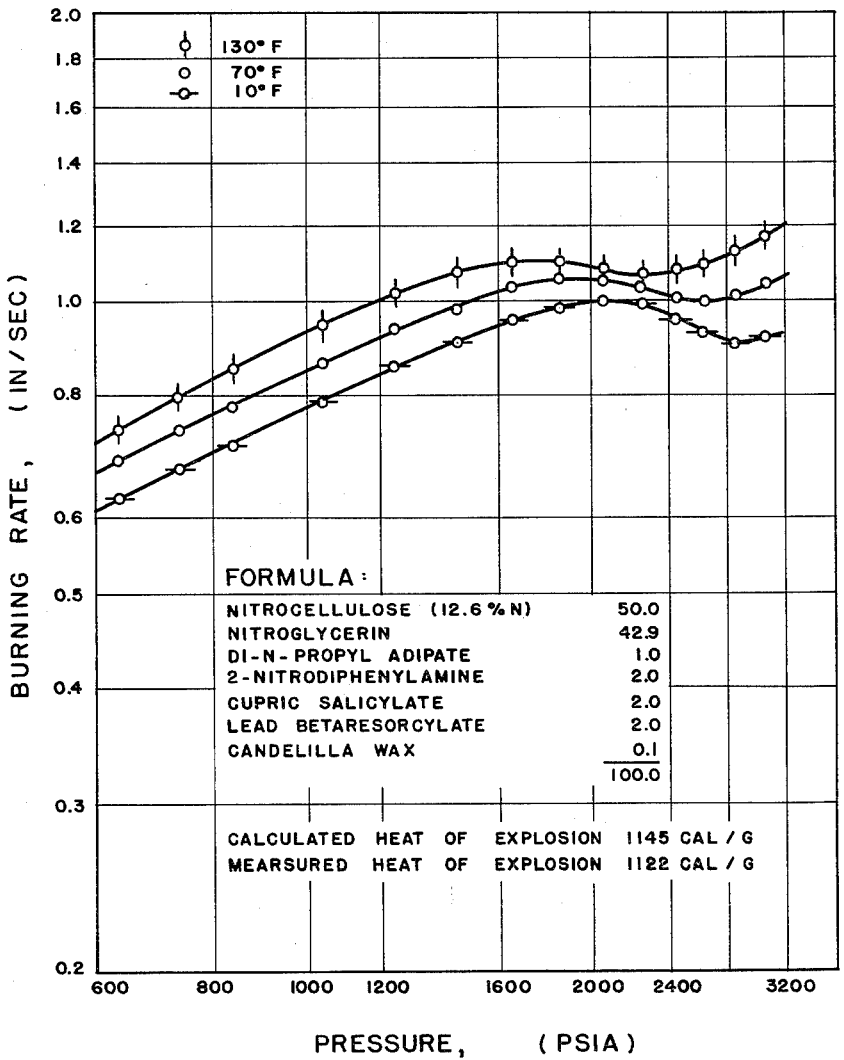
Figure 20:
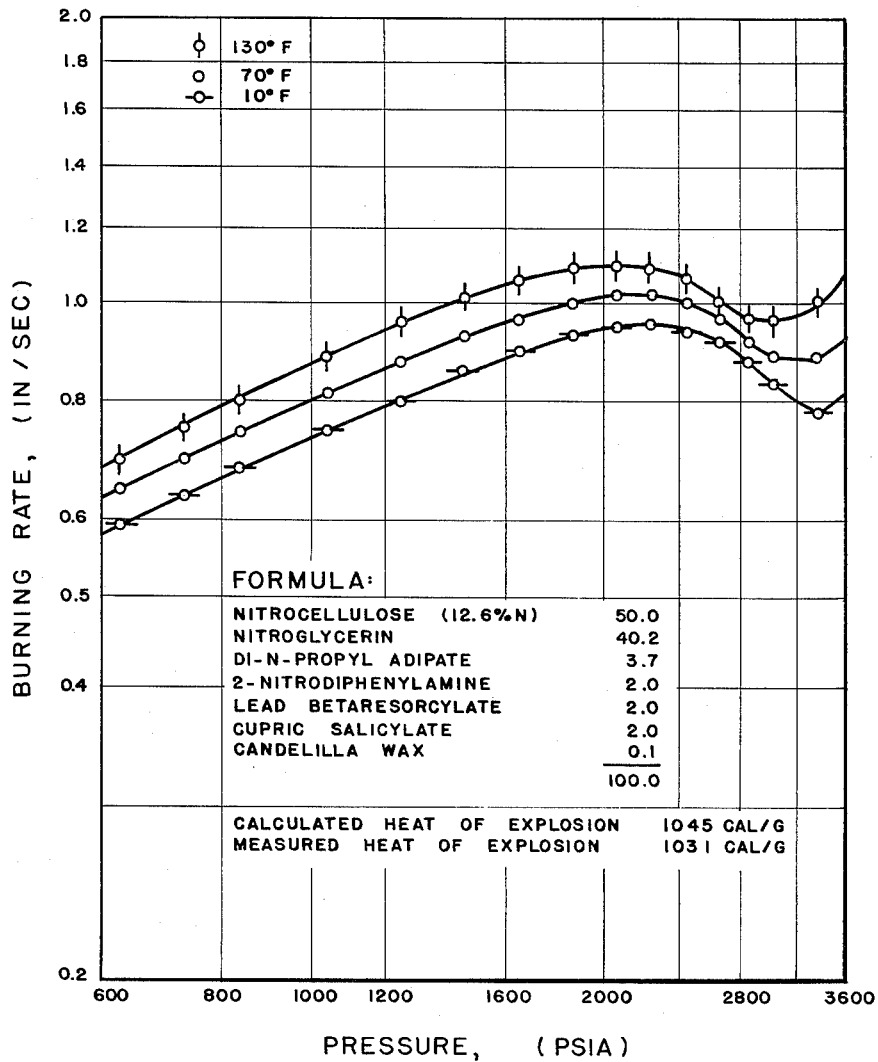
Figure 21:
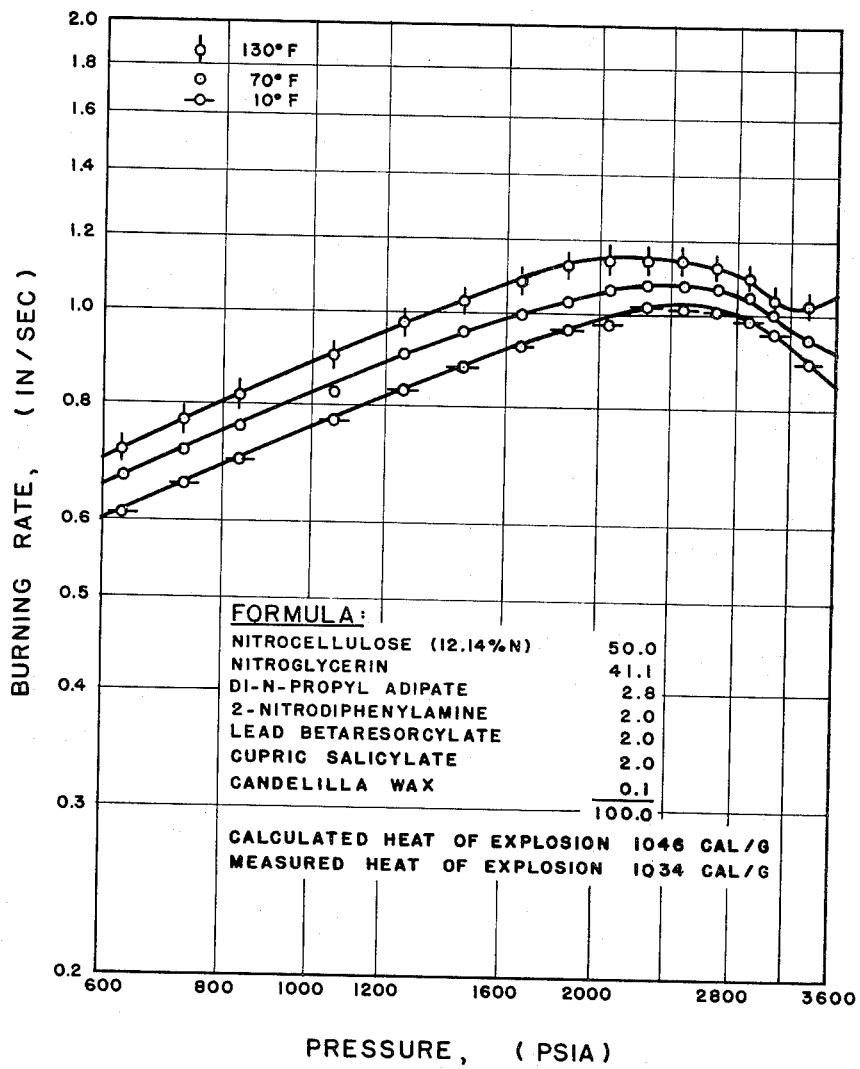

The compositions of FIGS. 16 and 17 illustrate the use of monobasic forms of cupric β-resorcylate and lead β-resorcylate. In the composition of FIG. 16 each salt is present in the amount of two percent. A mesa is exhibited starting at about 3000 p.s.i. In FIG. 17, the mesa occurs at about the same pressure region but at slightly higher burning rates. In cases where the modifying salts are both resorcylates, high burning rates and high pressures characterize the mesa regions.

The compositions of FIGS. 18, 19, 20 and 21 show the combined use of lead β-resorcylate and cupric salicylate, each present in the amount of two percent. Mesas occur at pressure ranges of 1800 p.s.i. in FIG. 19 to 2600 p.s.i. in FIG. 18, going up according to increasing heat of explosion. When compared with the compositions of FIGS. 11, 12, 13 and 14 which also contain lead β-resorcylate in combination with a second resorcylate, it is seen that the second resorcylate salt causes shift of the mesa to the right.

Figure 22:
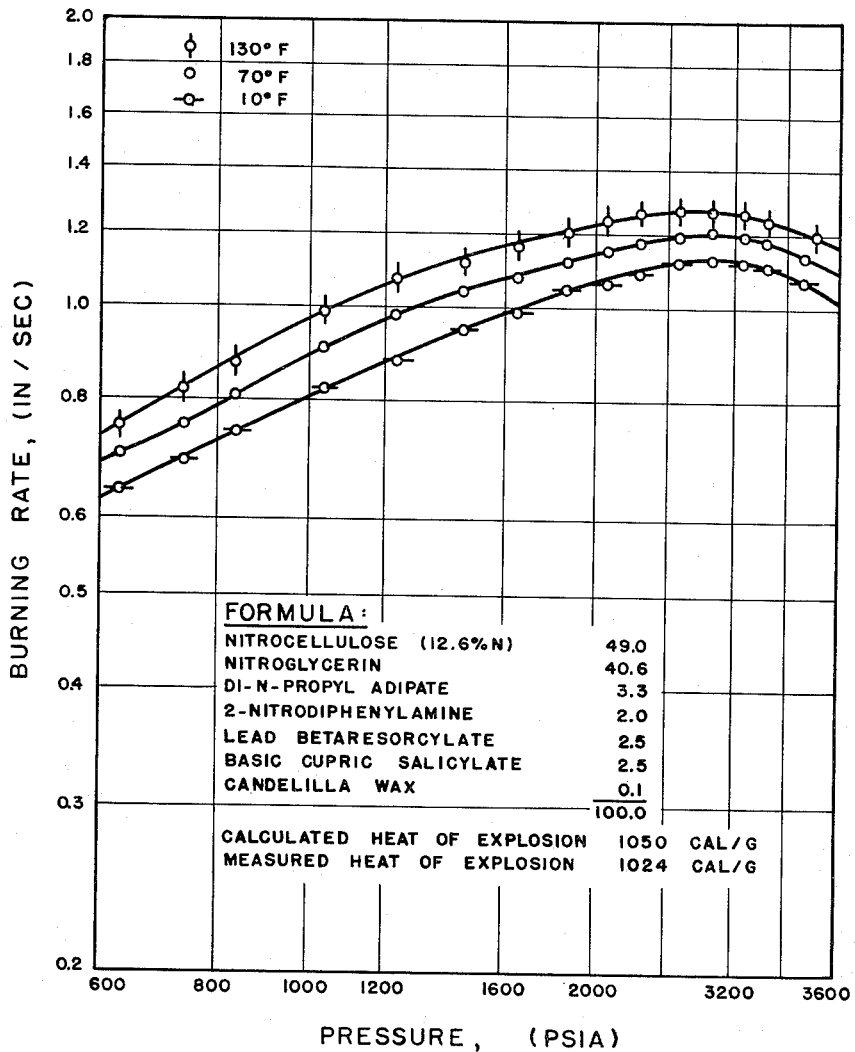
Figure 23:
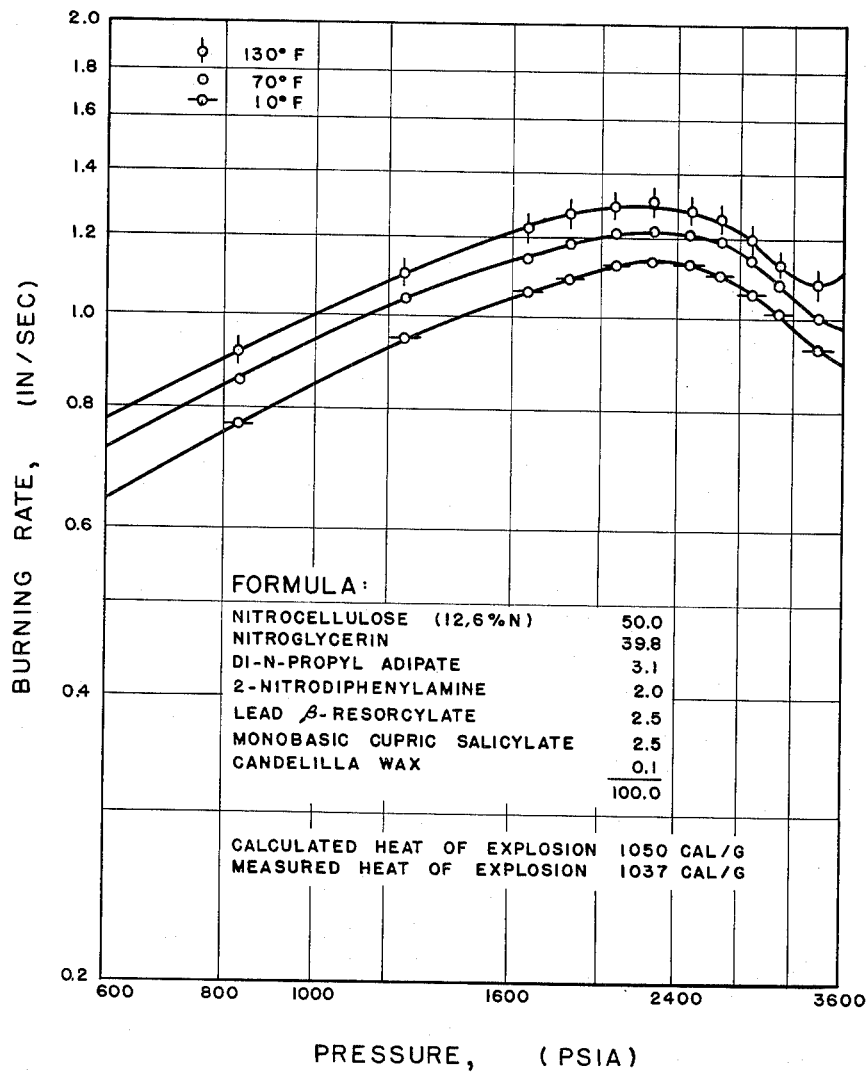

The compositions of FIGS. 22 and 23 show lead β-resorcylate and monobasic cupric salicylate. In the composition of FIG. 22, the basic salt has been substituted for the normal cupric salicylate in FIG. 18 with slightly higher burning rate and mesa shift to right.

Figure 24:
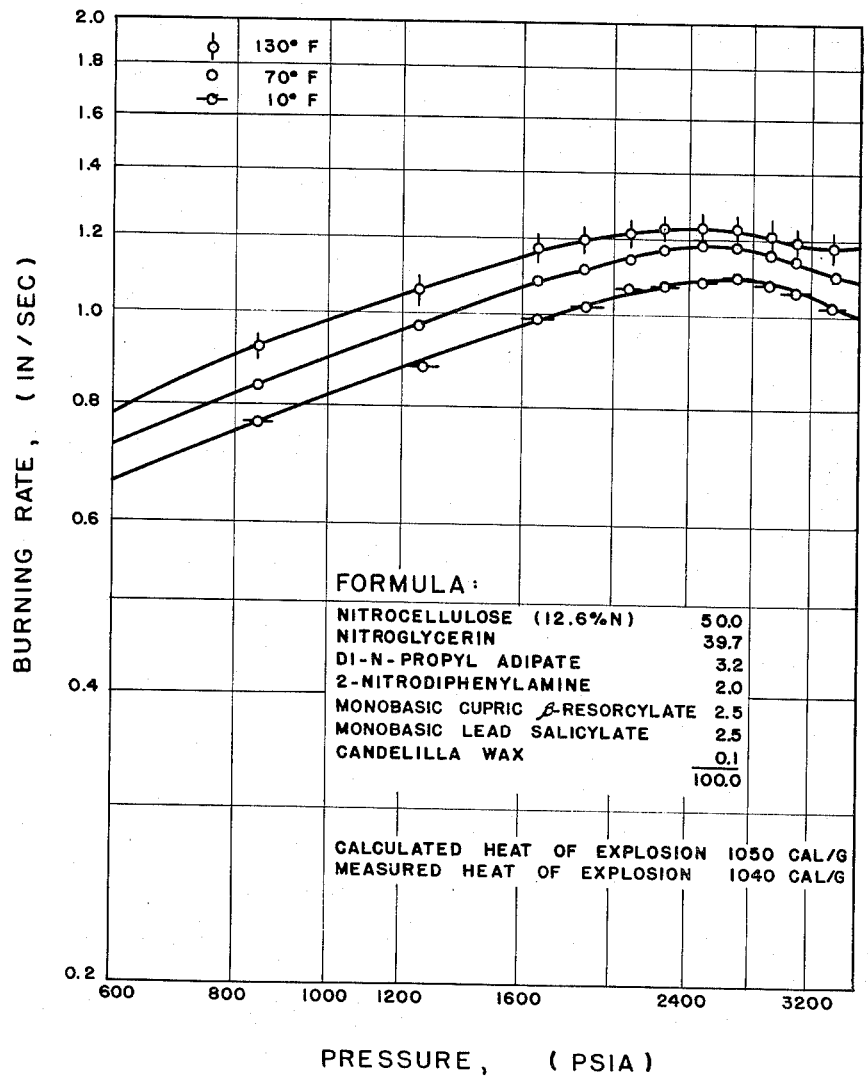
Figure 25:
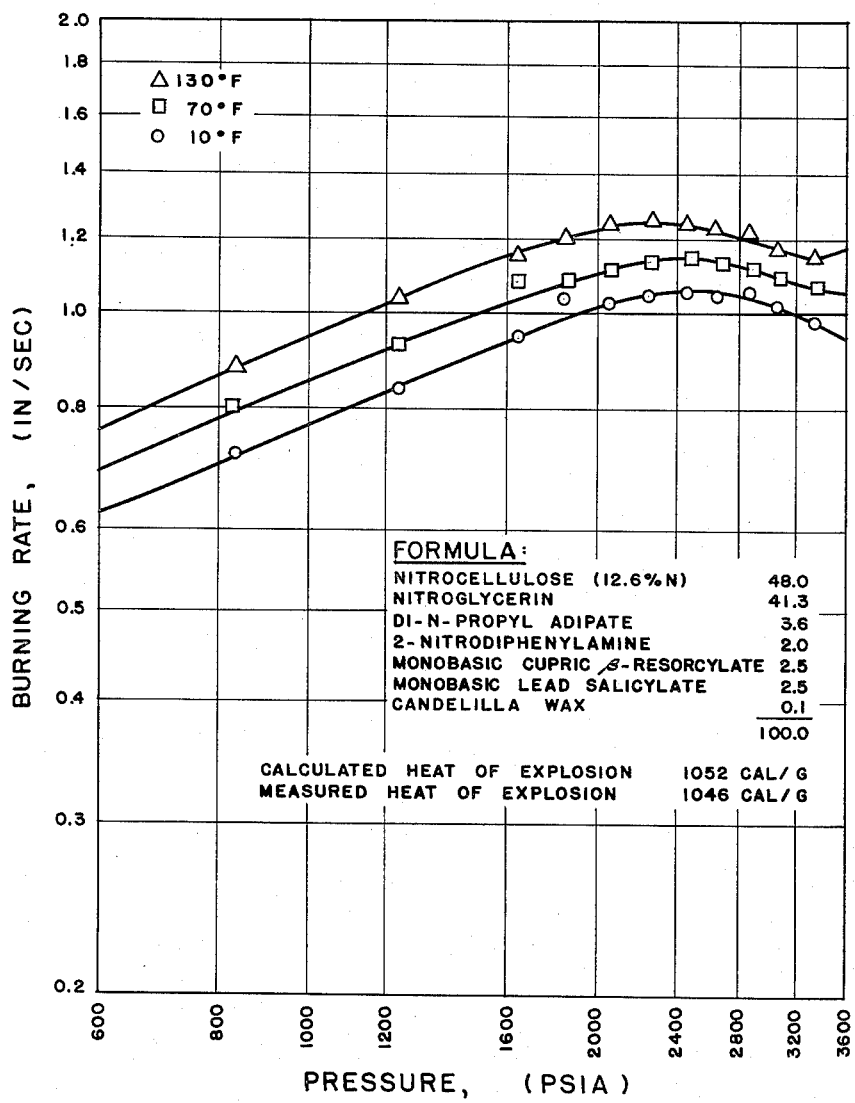

The compositions of FIGS. 24 and 25 show the combined use of the monobasic forms of cupric β-resorcylate and lead salicylate, each present in the amount of 2.5 percent in both compositions. Mesas begin at about 2400 p.s.i. with burning rates of about one inch per second to 1.2 inches per second.

It is thus seen that the invention provides propellant compositions exhibiting mesa characteristics which are substantially insensitive to temperature changes between operating pressure ranges of 200–4000 p.s.i. The compositions have high heats of explosion and their pressure-burning rate relationship is readily adjustable to provide ballistic characteristics to fit varying applications. A solventless process is provided for manufacturing the propellants which avoids the use of objectionable organic solvents. The propellent compositions were found to have good surveillance characteristics. They can be readily produced in quantity by mass production techniques.

Obviously, many modifications and variations of the present invention are possible in the light of the above teachings. It is therefore to be understood that within the scope of the appended claims the invention may be practiced otherwise than as specifically described.

What is claimed is:

1. A solventless processed propellant consisting essentially of 40–65 percent nitrocellulose, 20–45 percent nitroglycerin, and 0.1–10 percent of a ballistic modifier from the class consisting of (1) copper salts, normal and monobasic, of salicylic, β-resorcylic, 2,5-dihydroxybenzoic, and 5-methylene disalicylic acids, and mixtures thereof, and (2) mixtures of the aforementioned copper salts with corresponding lead salts and mixtures of such lead salts.

2. The propellant of claim 1 containing at least one salt of copper and one salt of lead, in which has been incorporated from about one to about ten weight percent of aluminum.

No references cited.